United States Patent [19]

Scheuble et al.

[11] Patent Number: 4,935,160

[45] Date of Patent: * Jun. 19, 1990

[54] LIQUID-CRYSTAL GUEST-HOST SYSTEMS

[75] Inventors: Bernhard Scheuble, Alsbach-Hähnlein; Georg Weber, Erzhausen; Ludwig Pohl, Darmstadt, all of Fed. Rep. of Germany

[73] Assignee: Merck Patent Gessellschaft Mit Beschrankter Haftung, Darmstadt, Fed. Rep. of Germany

[*] Notice: The portion of the term of this patent subsequent to Nov. 19, 2005 has been disclaimed.

[21] Appl. No.: 246,590

[22] Filed: Sep. 19, 1988

Related U.S. Application Data

[63] Continuation of Ser. No. 585,475, Mar. 2, 1984, abandoned.

[30] Foreign Application Priority Data

Mar. 2, 1983 [DE] Fed. Rep. of Germany ....... 3307238

[51] Int. Cl.$^5$ .............................................. C09K 19/00
[52] U.S. Cl. .................................. 252/299.1; 350/349
[58] Field of Search ....................... 252/299.1; 350/349

[56] References Cited

U.S. PATENT DOCUMENTS

| | | | |
|---|---|---|---|
| 4,032,219 | 6/1977 | Constant et al. | 252/299.1 |
| 4,356,102 | 10/1982 | Aftergut et al. | 252/299.1 |
| 4,378,302 | 3/1983 | Aftergut et al. | 252/299.1 |
| 4,472,292 | 9/1984 | Haas et al. | 252/299.1 |

FOREIGN PATENT DOCUMENTS

| | | | |
|---|---|---|---|
| 84208 | 7/1983 | European Pat. Off. | 252/299.1 |
| 3122148 | 11/1982 | Fed. Rep. of Germany | 252/299.1 |
| 55-127485 | 10/1980 | Japan | 252/299.1 |
| 56-112967 | 9/1981 | Japan | 252/299.1 |
| 58-147485 | 9/1983 | Japan | 252/299.1 |

OTHER PUBLICATIONS

Aftergut, S. et al., Mol. Cryst. Liq. Cryst., vol. 78, pp. 271–277 (1981).

Schenble, B. S., et al, Proc. SID, vol. 25, No. 1, pp. 25–30 (1984).

*Primary Examiner*—Matthew A. Thexton
*Assistant Examiner*—Richard Treanor
*Attorney, Agent, or Firm*—Millen, White & Zelano

[57] ABSTRACT

A liquid-crystal guest-host system has at least two pleochroic dyestuffs. At least one of the dyestuffs has an absorption maximum above 665 nm, and the dyestuffs and their concentrations are selected such that an electro-optical display element containing the liquid-crystal guest-host system shows a color separation ΔE, measured by the CIE (1964) method, to the point of achromatism of less than 5 units. The liquid-crystal guest-host system is useful for electro-optical display elements.

17 Claims, No Drawings

LIQUID-CRYSTAL GUEST-HOST SYSTEMS

This is a continuation of application Ser. No. 06/585,475 filed March 2, 1984 now abandoned.

BACKGROUND OF THE INVENTION

The invention relates to new liquid-crystal guest-host systems having at least two pleochroic dyestuffs.

Although numerous publications have dealt with liquid-crystal guest-host systems (G. H. Heilmeier and L. A. Zanoni, Appl. Phys. Lett. 13, 91 (1968); D. L. White and G. N. Taylor, J. Appl. Phys. 45, 4718 (1974); T. Uchida, H. Seki, C. Shishido and M. Wada, Mol. Cryst. Liq. Cryst. 54, 161 (1979)), they have not hitherto found any commercial use. In essence, there are two reasons for this: in the first place, a guest-host mixture which remained achromatic with respect to disparate modes of illumination and at the same time, in particular, with differing layer thicknesses of the guest-host system in the electro-optical display element has not existed. In addition, to date, the guest-host systems have only been suitable for a restricted temperature range (indoor use), since they have exhibited a markedly higher viscosity than the host material.

However, nowadays there is an increasing demand for a very wide temperature range (outdoor use), which is conditional on having guest-host systems which can still be operated even at very low temperatures.

SUMMARY OF THE INVENTION

Accordingly, it is an object of the present invention to provide new liquid-crystal guest-host systems which either lack the deficiencies indicated above or possess them to a markedly lower extent.

Upon further study of the specification and appended claims, further objects and advantages of this invention will become apparent to those skilled in the art.

These objects have been achieved by this invention by providing liquid-crystal guest-host systems having at least two pleochroic dyestuffs, wherein at least one of the dyestuffs has an absorption maximum above 665 nm, the dyestuffs and their concentrations being selected such that an electro-optical display element containing the liquid-crystal guest-host system exhibits a color separation $\Delta E$, measured by the CIE (1964) method, from the point of achromatism which is less than 5 units.

The invention also relates to the use of these guest-host systems for electro-optical display elements, and to electro-optical display elements containing these guest-host systems.

DETAILED DISCUSSION

It has been found that the liquid-crystal guest-host systems according to the invention are excellently suitable for electro-optical display elements. The liquid-crystal guest-host systems according to the invention are particularly distinguished by color properties which are independent of the mode of illumination and independent of the layer thickness. Furthermore, with the preparation of the liquid-crystal guest-host systems according to the invention, the utilizability of systems of this type is considerably extended in a variety of aspects of application technology. The liquid-crystal guest-host systems according to the invention and the electro-optical display elements containing them can be prepared for a very wide variety of applications, depending on the choice of the components in the host material and the pleochroic dyestuffs.

The guest-host systems according to the invention particularly include those having low viscosity which are outstandingly suitable for outdoor applications.

The guest-host systems according to the invention are composed of a host material suitable for the particular area of application together with at least two pleochroic dyestuffs.

The composition of the host material is not crucial. The host material can be nematic or cholesteric, and can contain optically active dopants. In principle, it is possible to use mixtures of all known liquid-crystal materials. The most important compounds suitable as constituents of host mixtures of this type may be characterized by the formula I

in which A and E are each a carbocyclic or heterocyclic ring system from the group comprising 1,4-disubstituted benzene and cyclohexane rings, 4,4'-disubstituted biphenyl, phenylcyclohexane and cyclohexylcyclohexane systems, bicyclooctane systems, 2,5-disubstituted pyrimidine and 1,3-dioxane rings, 2,6-disubstituted naphthalene, dihydronaphthalene and tetrahydronaphthalene, quinazoline and tetrahydroquinazoline, G is

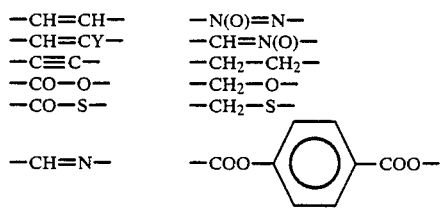

or a C—C single bond, Y is halogen, preferably chlorine, or CN, and $R^1$ and $R^2$ are alkyl, alkoxy, alkanoyloxy or alkoxycarbonyloxy having up to 18, preferably up to 8, carbon atoms, or one of these radicals is CN, NC, $NO_2$, $CF_3$, F, Cl or Br.

The 1,4-disubstituted benzene rings in the compounds of the formula I can be substituted by lateral groups customary in liquid-crystal materials. The trans-1,4-disubstituted cyclohexane rings can be substituted in the 1- or 4- position by axial groups customary in liquid-crystal materials (e.g., CN, F, $CH_3$). Preferably, the host material contains at least one liquid-crystal compound having such an axial substituted cyclohexane ring.

In most of these compounds, $R^1$ and $R^2$ differ from one another, one of these radicals usually being an alkyl or alkoxy group. However, other variants of the envisaged substituents are also customarily used. Many of these types of substances, or mixtures thereof, are obtainable commercially. All can be prepared by customary standard methods.

| Compounds of the formulae Ia to Im | |
|---|---|
| $R^1$-Cy -Ph-$R^2$ | Ia |
| $R^1$-Cy -Ph-Ph -$R^2$ | Ib |
| $R^1$-Cy -Ph-Ph -Cy-$R^2$ | Ic |
| $R^1$-Cy -Ph-COO-Cy-$R^2$ | Id |
| $R^1$-Cy -Ph-OCO-Cy-$R^2$ | Ie |
| $R^1$-Ph -Ph-$R^2$ | If |
| $R^1$-Ph -Ph-Ph -$R^2$ | Ig |

| -continued |  |
| --- | --- |
| Compounds of the formulae Ia to Im |  |
| $R^1$-Dio-Ph-$R^2$ | Ih |
| $R^1$-Py -Ph-$R^2$ | Ii |
| $R^1$-Cy-COO-Cy-$R^2$ | Ij |
| $R^1$-Cy-Cy-COO-Cy-$R^2$ | Ik |
| $R^1$-Cy-Cy-OCO-Cy-$R^2$ | Il |
| $R^1$-Cy-CH$_2$-CH$_2$-Ph-$R^2$ | Im | are preferably used as constituents in the host mixtures, in these Ph being a 1,4-phenylene group, Cy being a 1,4-cyclohexylene group, Dio being a 1,3-dioxan-2,5-diyl group, Py being a pyrimidin-2,5-diyl group, and $R_1$ and $R_2$ having the indicated meanings.

The guest-host systems according to the invention additionally contain at least 2, preferably 3 to 5, pleochroic dyestuffs, at least one of the dyestuffs having an absorption maximum above 665 nm, preferably above 670 nm, in particular above 685 nm. In principle, all pleochroic dyestuffs suitable for guest-host mixtures can be used. The most important of these dyestuffs belong to the classes of anthraquinone, naphthoquinone, azo, indigo and/or perylene dyestuffs.

A rich variety of these are described in the literature. The expert can, without difficulty, discover the dyestuffs best suited for use for a particular purpose. Thus, for example, anthraquinone dyestuffs are described in European Patent No. 34,832, European Patent No. 44,893, European Patent No. 48,583, European Patent No. 54,217, European Patent No. 56,492, European Patent No. 59,036, British Patent No. 2,065,158, British Patent No. 2,065,695, British Patent No. 2,081,736, British Patent No. 2,082,196, British Patent No. 2,094,822, British Patent No. 2,094,825, Japanese Published Specification No. 55-123673, German Patent No. 3,017,877, German Patent No. 3,040,102, German Patent No. 3,115,147, German Patent No. 3,115,762, German Patent No. 3,150,803 and German Patent No. 3,201,120; naphthoquinone dyestuffs are described in German Patent Nos. 3,126,108 and 3,202,761; azo dyestuffs in European Patent No. 43,904, German Patent No. 3,123,519, PCT WO No. 82/2054, British Patent No. 2,079,770, Japanese Published Specification No. 56-57850, Japanese Published Specification No. 56-104984, U.S. Pat. No. 4,308,161, U.S. Pat. No. 4,308,162, U.S. Pat. No. 4,340,973, T. Uchida, C. Shishido, H. Seki and M. Wada: Mol. Cryst. Liq. Cryst. 39, 39-52 (1977) and H. Seki, C. Shishido, S. Yasui and T. Uchida: Jpn. J. Appl. Phys. 21, 191-192 (1982); and perylenes are described in European Patent No. 60,895, European Patent No. 68,427 and PCT WO No. 82/1191.

In the text which follows, some groups from these classes of dyestuffs are indicated in more detail:

(a) Anthraquinone dyestuffs having S-alkyl, S-cycloalkyl and/or S-aryl groups, for example of the formula II

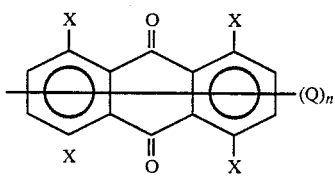

in which Q is NH$_2$, OH, alkyl, aryl, NO$_2$ or halogen, and n is 0, 1, 2, 3 or 4, X in each instance is H, SR, NZ$_1$Z$_2$ or Q, R in each instance is alkyl, aryl or cycloalkyl, and Z$_1$ and Z$_2$ in each instance are H, alkyl, aryl, or cycloalkyl (these types of dyestuffs are known, for example from European Patent No. 0,059,036), and (b) Anthraquinone dyestuffs having substituted phenyl and/or cyclohexyl groups, for example of the formula III

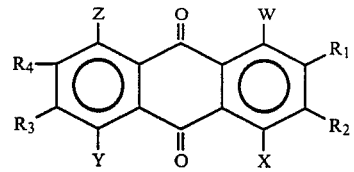

in which W, X, Y and Z are hydrogen, NH$_2$, OH, NHCH$_3$ or NHC$_2$H$_5$, and 1 or 2 of the radicals R$_1$, R$_2$, R$_3$ and R$_4$ is a group of the part formulae —Ph—R, —Ph—OR, —Cy—R, —Ph—Cy—R or —Cy—Cy—R and the others are hydrogen, R being an alkyl group having 1-12 carbon atoms (these types of dyestuffs are known, for example from German Patent No. 3,040,102), and (c) Naphthoquinone dyestuffs, for example of the formula IV

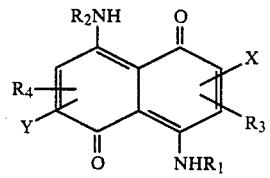

in which X and Y are identical or different and are hydrogen, chlorine or bromine, R$_1$, R$_2$, R$_3$ and R$_4$ are hydrogen, alkyl or alkoxyalkyl having up to 8 C atoms or a cyclic group Z, Z is —Ph—R, —Ph—Ph—R, —Cy—R, —Cy—Cy—R, —Ph—Cy—R or —Cy—Ph—R, and R is alkyl, alkoxy, alkoxyalkyl, alkoxyalkoxy or alkanoyloxy having up to 8 C atoms (these types of dyestuffs are known, for example, from German Patent No. 3,126,108), and (d) Azo dyestuffs, for example of the formula V

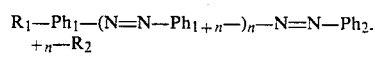

in which R$_1$ is alkyl or alkylsulphonyl, R$_2$ is dialkylamino, monoalkylamino or a 5- or 6-membered cycloalkylamino group, and n is 1, 2 or 3, it being possible for a second benzene ring to be fused onto the benzene rings to form naphthalene structures (these types of dyestuff are known, for example from U.S. Pat. No. 4,340,973), and/or (e) Azo dyestuffs, for example of the formula VI

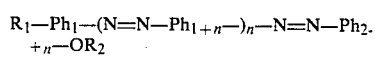

in which R$_1$ is alkyl, R$_2$ is alkyl, alkylcarbonyl, arylcarbonyl or alkyloxycarbonyl, and n is 1, 2, 3 or 4, it being possible for a second benzene ring to be fused on to the benzene rings to form naphthalene structures (these types of dyestuffs are known, for example from Japanese Published Specification No. 56-104984).

In principle, it is possible to use, as the plechroic dyestuffs having an absorption maximum above 665 nm, all dyestuffs suitable for guest-host mixtures and fulfilling this condition. The azo dyestuffs of the formulae V and VI and the naphthoquinone dyestuffs of the formula IV detailed above are particularly preferred.

The guest-host systems according to the invention can be adjusted to suit a very wide variety of areas of use by suitable choice of the dyestuff components and the relative concentrations of dyestuffs.

Anthraquinone, naphthoquinone and/or perylene dyestuffs are preferably used for indoor applications.

Azo dyestuffs and/or naphthoquinone dyestuffs are preferably used for outdoor applications.

As a rule, the guest-host systems according to the invention contain 0.1 to 15, preferably 0.5 to 10, in particular 1 to 7, percent by weight of pleochroic dyestuffs, as a rule the percentage of the dyestuff or the dyestuffs having an absorption maximum of above 665 nm being 0.5 to 5, preferably 1 to 4. As a rule, preferred guest-host systems according to the invention with azo dyestuffs as pleochroitic dyestuff or pleochroic dyestuffs having an absorption maximum of above 665 nm contain 0.1 to 5, preferably 0.3 to 4, percent by weight of these azo dyestuffs.

It is of fundamental importance for the independence of the mode of illumination and, in particular, for the independence of the layer thickness of the guest-host system according to the invention for the pleochroic dyestuffs therein to mask a suitable part of the visible spectrum and for the absorption in this range to be more or less constant.

Both of these requirements will be met as long as an effective amount of at least one pleochroic dye having an absorption maximum above 665 nm is contained in the guest-host system of this invention.

The absorption maximum is a characteristic parameter of a dyestuff and the one type of dyestuff to be used according to the invention shall have its absorption maximum above 665 nm, within the visible range (about 400 to 800 nm). All those dyestuffs normally have unstructured absorption, i.e., they show a broad absorption band within the visible range. Maxima within the UV range are not to be considered here. Decisive is the maximum at the longest wave length in the visible range.

For every pleochroic dyestuff having an absorption maximum above 665 nm, there will be an appropriate concentration range in the liquid-host system of this invention that the desired color properties will be achieved. This concentration range can be routinely determined by simple preliminary experiments using this disclosure as a guide.

The so-called metameric matching, as has been described by, for example, T. J. Scheffer [J. Appl. Phys. 53, 257 (1982)] is used for this purpose. This entails assigning a vector to each color starting from the location of black. Normal illumination is replaced by the international standard illumination CIE-A (light from an incandescent lamp) and CIE-D65 (medium daylight). The condition of achromatism for these two extreme illuminations ensures that the display remains achromatic even with other illuminations. The color can be represented in a diagram color plane, the color coordinates being selected such that color differences which are identical to the human eye also correspond to identical separations in the color diagram. In this instance, the 1976 CIE-UCS color diagram was used. A preferred black mixture is obtained by, for example, selecting the dyestuff concentrations such that $\Delta u$ and $\Delta v$ for all modes of illumination become 0.

If it is wished to express color differences numerically, then it is possible to convert, using a color separation formula, the measured CIE color values into a color separation $\Delta E$ which is a measure of the color difference detected visually. The eye of a normal human observer is unable to perceive color separations much smaller than 1. The acceptable industrial tolerance for color separations is generally in the range between 0 and 5.

The color separations $\Delta E$ obtained with the electro-optical display elements according to the invention are smaller than 5, preferably smaller than 1, in particular smaller than 0.5. In particular, these color separations are independent of the mode of illumination and the layer thickness, that is to say the changes in the color separations on varying the mode of illumination and/or the layer thickness of the electro-optical display element are smaller than 1 and thus not detectable by the human eye.

The layer thicknesses of the dielectrics normally range between 3 and 50 micron.

The liquid-crystal guest-host systems according to the invention can be used for positive and/or negative image representation.

The preparation of the guest-host systems according to the invention is carried out in a manner which is customary per se. As a rule, the desired amounts of the various pleochroic dyestuffs, which may be obtained from the metameric matching, are dissolved in the host material, preferably at elevated temperature.

However, it is also possible to mix solutions of the pleochroic dyestuff and the host material in a suitable organic solvent, for example acetone, chloroform or methanol, and, after thorough mixing, to remove the solvent again, for example by distillation under reduced pressure. Obviously, care has to be taken that no contaminants or undesired dopants are introduced by the solvent in this procedure.

The liquid-crystal guest-host systems according to the invention can be modified by suitable additives such that they can be used in all types of guest-host display elements which have hitherto been disclosed. Additives of these types are known to the expert and are described in detail in the relevant literature. For example, it is possible to add substances to change the dielectric anisotropy, the viscosity, the conductivity and/or the orientation of the nematic phases. These types of substances are described in, for example, German Offenlegungsschriften Nos. 2,209,127, 2,240,864, 2,321,623, 2,338,281 and 2,450,088.

For illustration purposes, the following description of the preparation of a very suitable dyestuff mixture of $\lambda$max 688 nm is given the procedure following standard techniques:

18.8 g of 4,8-diamino-1,5-naphthoquinone, 4.1 g of 4-n-butyloxyaniline, 4.5 g of 4-n-pentyloxyaniline, 4.8 g of 4-n-hexylaniline and 5.2 g of 4-n-heptylaniline are dissolved in 200 ml of acetic acid. The reaction mixture is stirred for 2 h at 100° C., then allowed to cool down to room temperature and finally poured into 1 l of ice water.

The precipitate formed is isolated by filtration, washed thoronghly with water, and dried. The crude dye mixture is recrystallized from isobutylmethylketone to yield the mixed dye in a pure state. Melting range: 154°–156.5° C.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

In the examples, m.p. denotes the melting point and c.p. denotes the clear point of a liquid-crystal substance in degrees centigrade.

EXAMPLE 1

2.2% of ICI anthraquinone dyestuff Red 77 ($\lambda$max=555 nm)
2.2% of ICI anthraquinone dyestuff Yellow 99 ($\lambda$max=463 nm)
0.6% of ICI anthraquinone dyestuff Blue 26 ($\lambda$max=638 nm) and
1.4% of a mixture of naphthoquinone dyestuffs of the formula IV (obtainable by reaction of 4,8-diamino-1,5-naphthoquinone with equimolar amounts of 4-n-butoxyaniline, 4-n-pentyloxyaniline, 4-n-hexyloxyaniline and 4-n-heptyloxyaniline, $\lambda_{max}$=688 nm) were dissolved in a liquid-crystal mixture of
18% of 4-(trans-4-n-propylcyclohexyl)benzonitrile
14% of 4-(trans-4-n-butylcyclohexyl)benzonitrile
25% of 4-(trans-4-n-pentylcyclohexyl)benzonitrile
15% of 4-(trans-4-n-heptylcyclohexyl)benzonitrile
7% of 4-(trans-4-n-pentylcyclohexyl)-4'-cyanobiphenyl
7% of 4-(trans-4-n-pentylcyclohexyl)-4'-(trans-4-n-propylcyclohexyl)biphenyl
6% of 4-n-pentyl-4'-cyanoterphenyl and
8% of 4-(trans-4-n-propylcyclohexyl)phenyl trans-4-n-butylcyclohexanecarboxylate.

In an electro-optical display element at a layer thickness of 1 $\mu$m, this guest-host system shows a color separation $\Delta$E to the point of achromatism of 0.3 under artificial light (CIE-A), and a color separation $\Delta$E of 0.2 under daylight (CIE-D65). The color separations $\Delta$E at a layer thickness of 14 $\mu$m are 0.3 (CIE-A) and 0.7 (CIE-D65).

These figures indicate that the color properties of the electro-optical display element for the human eye are independent of the mode of illumination and layer thickness selected.

EXAMPLE 2

6.4% of the dyestuff mixture indicated in Example 1 are dissolved in a liquid-crystal mixture of
17% of 4-(trans-5-n-butyl-1,3-dioxan-2-yl)benzonitrile
14% of 4-ethyl-4'-cyanobiphenyl
26% of 4-n-butyl-4'-cyanobiphenyl
8% of 4-(trans-4-pentylcyclohexyl)-4'-cyanobiphenyl
5% of 4-cyanophenyl 4-(trans-4-ethylcyclohexyl)benzoate and
7% of 4-cyanophenyl 4-(trans-4-n-pentylcyclohexyl)-benzoate.

In an electro-optical display element at a layer thickness of 2 $\mu$m, this guest-host system shows a color separation $\Delta$E to the point of achromatism of 0.6 under artificial light (CIE-A) and a color separation $\Delta$E of 0.3 under daylight (CIE-D65). The color separations $\Delta$E at a layer thickness of 16 $\mu$m are 0.2 (CIE-A) and 0.5 (CIE-D65).

These figures show that the color properties of the electro-optical display element for the human eye are independent of the mode of illumination and layer thickness selected.

EXAMPLE 3

6.4% of the dyestuff mixture indicated in Example 1 are dissolved in a liquid-crystal mixture of
18% of 4-(trans-4-n-propylcyclohexyl)benzonitrile
14% of 4-(trans-4-n-butylcyclohexyl)benzonitrile
25% of 4-(trans-4-n-pentylcyclohexyl)benzonitrile
13% of 4-(trans-4-n-heptylcyclohexyl)benzonitrile
15% of 4-(trans-4-n-pentylcyclohexyl)-4'-ethylbiphenyl
5% of 4-(trans-4-n-pentylcyclohexyl)-4'-cyanobiphenyl and
10% of 4-(trans-4-n-pentylcyclohexyl)-4'-(trans-4-n-propylcyclohexyl)biphenyl.

In an electro-optical display element at a layer thickness of 5 $\mu$m, this guest-host system shows a color separation $\Delta$E to the point of achromatism of 0.8 under artificial light (CIE-A) and a color separation $\Delta$E of 0.7 under daylight (CIE-D65). The color separations $\Delta$E at a layer thickness of 18 $\mu$m are 0.1 (CIE-A) and 0.3 (CIE-D65).

These figures show that the color properties of the electro-optical display element for the human eye are independent of the mode of illumination and layer thickness selected.

EXAMPLE 4

0.3% of azo dyestuff G 207 ($\lambda$max=395 nm, Formula VI, $R_1$=$C_4H_9$, $R_2$=$C_3H_7$, n=1)
0.6% of azo dyestuff G 232 ($\lambda$max=443 nm, Formula V, $R_1$=$R_2$=—$NHC_4H_9$, n=2, $Ph_3$=1,4-naphthylene)
0.3% of azo dyestuff G 239 ($\lambda$max=520 nm, Formula V, $R_1$=$C_4H_9$, $R_2$=$N(CH_3)_2$, n=1, $Ph_2$=1,4-naphthylene)
0.7% of azo dyestuff G 241 ($\lambda$max=560 nm, Formula V, $R_1$=$C_4H_9$, $R_2$=$N(C_2H_5)_2$, n=2, $Ph_3$=1,4-naphthylene) and
2.9% of a mixture of naphthoquinone dyestuffs of the Formula IV (obtainable by the reaction of 4,8-diamino-1,5-naphthoquinone with equimolar amounts of 4-n-butoxyaniline, 4-n-pentoxyaniline, 4-n-hexyloxyaniline and 4-n-heptyloxyaniline, $\lambda$max=688 nm)
are dissolved in a liquid-crystal mixture of
15% of 4-(trans-4-n-propylcyclohexyl)benzonitrile
27% of 4-(trans-4-n-propylcyclohexyl)ethylbenzene
10% of 4-(trans-4-n-propylcyclohexyl)ethoxybenzene
7% of 4-(trans-4-n-pentylcyclohexyl)-4'-cyanobiphenyl
9% of 4-(trans-4-n-propylcyclohexyl)-4'-ethylbenzene
8% of 4-(trans-4-n-pentylcyclohexyl)-4'-ethylbenzene
10% of 4-(trans-4-n-pentylcyclohexyl)-4'-(trans-4-n-propylcyclohexyl)biphenyl
8% of 4-n-propylphenyl 4-(trans-4-n-propylcyclohexyl)-benzoate and
6% of 4-n-propylphenyl 4-(trans-4-n-pentylcyclohexyl)-benzoate.

In an electro-optical display element at a layer thickness of 1 $\mu$m, this guest-host system shows a color separation $\Delta$E to the point of achromatism of 0.4 under artificial light (CIE-A) and a color separation $\Delta$E of 0.3 under daylight (CIE-D65). The color separations $\Delta$E at a layer thickness of 5 (10) $\mu$m are 0.98 (0.2) (CIE-A) and 0.6 (0.1) (CIE-D65).

These figures show that the color properties of the electro-optical display element for the human eye are independent of the mode of illumination and layer thickness selected.

EXAMPLE 5

0.4% of azo dyestuff G 207 ($\lambda$max=395 nm, Formula VI, $R_1=C_4H_9$, $R_2=C_3H_7$, n=1)

0.7% of azo dyestuff G 232 ($\lambda$max=443 nm, Formula V, $R_1=R_2=-NHC_4H_9$, n=2, $Ph_3=1,4$-naphthylene)

0.4% of azo dyestuff G 239 ($\lambda$max=520 nm, Formula V, $R_1=C_4H_9$, $R_2=N(CH_3)_2$, n=1, $Ph_2=1,4$-naphthylene)

0.9% of azo dyestuff G 241 ($\lambda$max=560 nm, Formula V, $R_1=C_4H_9$, $R_2=N(C_2H_5)_2$, n=2, $Ph_3=1,4$-naphthylene and 3.7% of a mixture of naphthoquinone dyestuffs of the Formula IV (obtainable by reaction of 4,8-diamino-1,5-naphthoquinone with equimolar amounts of 4-n-butoxyaniline, 4-n-pentoxyaniline, 4-n-hexyloxyaniline and 4-n-heptyloxyaniline, $\lambda$max=688 nm)

are dissolved in a liquid-crystal mixture of

19% of 4-(trans-4-ethylcyclohexyl)cyclohexane-4'-carbonitrile

19% of 4-(trans-4-n-butylcyclohexyl)cyclohexane-4'-carbonitrile

9% of 4-(trans-5-n-propyl-1,3-dioxan-2-yl)benzonitrile

10% of 4-(trans-5-n-butyl-1,3-dioxan-2-yl)benzonitrile

9% of 4-(trans-4-n-propylcyclohexyl)phenyl trans-4-n-pentylcyclohexanecarboxylate 9% of trans-4-n-propylcyclohexyl trans-4-(trans-4-n-butylcyclohexyl)cyclohexanecarboxylate 15% of trans-4-n-propylcyclohexyl trans-4-n-pentylcyclohexanecarboxylate 7% of 4,4'-bis(trans-4-n-propylcyclohexyl)biphenyl and 3% of 4-(trans-4-n-pentylcyclohexyl)-4'-(trans-4-n-propylcyclohexyl)biphenyl.

In an electro-optical display element at a layer thickness of 1 $\mu$m, this guest-host system shows a color separation $\Delta E$ to the point of achromatism of 0.2 under artificial light (CIE-A) and a color separation $\Delta E$ of 0.6 under daylight (CIE-D65). The color separations $\Delta E$ at a layer thickness of 7 $\mu$m are 0.2 (CIE-A) and 0.5 (CIE-D65).

These figures show that the color properties of the electro-optical display element for the human eye are independent of the mode of illumination and layer thickness selected.

EXAMPLE 6

6.1% of the dyestuff mixture described in Example 5 are dissolved in a liquid-crystal mixture of 17% of 4-(trans-4-n-propylcyclohexyl)benzonitrile 23% of 4-(trans-4-n-pentylcyclohexyl)benzonitrile 16% of 4-(trans-4-n-propylcyclohexyl)ethoxybenzene 12% of 4-(trans-4-n-propylcyclohexyl)butoxybenzene 22% of 4-(trans-4-n-pentylcyclohexyl)-4'-ethylbiphenyl 10% of 4-(trans-4-n-pentylcyclohexyl)-4'-(trans-4-n-propylcyclohexyl)biphenyl.

In an electro-optical display element at a layer thickness of 1 $\mu$m, this guest-host system shows a color separation $\Delta E$ to the point of achromatism of 0.2 under artificial light (CIE-A) and a color separation $\Delta E$ of 0.4 under daylight (CIE-D65). The color separations $\Delta E$ at a layer thickness of 5 (8) $\mu$m are 0.4 (0.2) (CIE-A) and 0.6 (0.1) (CIE-D65).

These figures show that the color properties of the electro-optical display element for the human eye are independent of the mode of illumination and layer thickness selected.

EXAMPLE 7

0.3% of azo dyestuff G 207 ($\lambda$max=395 nm, Formula VI, $R_1=C_4H_9$, $R_2=C_3H_7$, n=1)

0.6% of azo dyestuff G 232 ($\lambda$max=443 nm, Formula V, $R_1=R_2=-NHC_4H_9$, n=2, $Ph_3=1,4$-naphthylene)

0.3% azo dyestuff G 239 ($\lambda$max=520 nm, Formula V, $R_1=C_4H_9$, $R_2=N(CH_3)_2$, n=1, $Ph_2=1,4$-naphthylene)

0.7% of azo dyestuff G 241 ($\lambda$max=560 nm, Formula V, $R_1=C_4H_9$, $R_2=N(C_2H_5)_2$, n=2, $Ph_3=1,4$-naphthylene)

2.9% of a mixture of naphthoquinone dyestuffs of the Formula IV (obtainable by reaction of 4,8-diamino-1,5-naphthoquinone with equimolar amounts of 4-n-butoxyaniline, 4-n-pentoxyaniline, 4-n-hexyloxyaniline and 4-n-heptyloxyaniline, $\lambda$max=688 nm)

are dissolved in a liquid-crystal mixture of

17% of r-1-cyano-cis-4-(trans-4-n-propylcyclohexyl)-1-n-pentylcyclohexane

35% of r-1-cyano-cis-4-(trans-4-n-propylcyclohexyl)-1-n-heptylcyclohexane

30% of r-1-cyano-cis-4-(trans-4-n-pentylcyclohexyl)-1-n-pentylcyclohexane and

18% of r-1-cyano-cis-4-(trans-4-n-heptylcyclohexyl)-1-n-propylcyclohexane.

In an electro-optical display element at a layer thickness of 1 $\mu$m, this guest-host system shows a color separation $\Delta E$ to the point of achromatism of 0.3 under artificial light (CIE-A) and a color separation $\Delta E$ of 0.4 under daylight (CIE-D65). The color separations $\Delta E$ at a layer thickness of 7 $\mu$m are 0.4 (CIE-A) and 0.3 (CIE-D65).

These figures show that the color properties of the electro-optical display element for the human eye are independent of the mode of illumination and layer thickness selected.

EXAMPLE 8

0.3% of azo dyestuff G 207 ($\lambda$max=395 nm, Formula VI, $R_1=C_4H_9$, $R_2=C_3H_7$, n=1)

0.6% of azo dyestuff G 232 ($\lambda$max=443 nm, Formula V, $R_1=R_2=-NHC_4H_9$, n=2, $Ph_3=1,4$-naphthylene)

0.3% of azo dyestuff G 239 ($\lambda$max=520 nm, Formula V, $R_1=C_4H_9$, $R_2=N(CH_3)_2$, n=1, $Ph_2=1,4$-naphthylene)

0.7% of azo dyestuff G 241 ($\lambda$max=560 nm, Formula V, $R_1=C_4H_9$, $R_2=N(C_2H_5)_2$, n=2, $Ph_3=1,4$-naphthylene) an 2.9% of a mixture of naphthoquinone dyestuffs of the Formula IV (obtainable by reaction of 4,8-diamino-1,5-naphthoquinone with equimolar amounts of 4-n-butoxyaniline, 4-n-pentoxyaniline, 4-n-hexyloxyaniline and 4-n-heptyloxyaniline, $\lambda$max=688 nm)

are dissolved in a liquid-crystal mixture of

9% of r-1-cyano-cis-4-(trans-4-n-propylcyclohexyl)-1-n-pentylcyclohexane

18% of r-1-cyano-cis-4-(trans-4-n-propylcyclohexyl)-1-n-heptylcyclohexane

16% of r-1-cyano-cis-4-(trans-4-n-pentylcyclohexyl)-1-n-pentylcyclohexane

9% of r-1-cyano-cis-4-(trans-4-n-heptylcyclohexyl)-1-n-propylcyclohexane

16% of trans-4-n-propylcyclohexyl p-trans-4-n-butylcyclohexylbenzoate

11% of trans-4-n-propylcyclohexyl p-trans-4-n-pentylcyclohexylbenzoate

13% of trans-4-n-propylcyclohexyl trans-4-n-pentylcyclohexanecarboxylate and

8% of trans-4-n-propylcyclohexyl trans,trans-4-n-butylcyclohexylcyclohexane-4-carboxylate.

In an electro-optical display element at a layer thickness of 2 μm, this guest-host system shows a color separation ΔE to the point of achromatism of 0.5 under artificial light (CIE-A) and a color separation ΔE of 0.7 under daylight (CIE-D65). The color separation ΔE at a layer thickness of 7 μm is 0.3 under artificial light and daylight.

These figures show that the color properties of the electro-optical display element for the human eye are independent of the mode of illumination and layer thickness selected.

EXAMPLE 9

0.3% of azo dyestuff G 207 (λmax=395 nm, Formula VI, $R_1=C_4H_9$, $R_2=C_3H_7$, n=1)

0.6% of azo dyestuff G 232 (λmax=443 nm, Formula V, $R_1=R_2=$—$NHC_4H_9$, n=2, $Ph_3=$1,4-naphthylene)

0.3% of azo dyestuff G 239 (λmax=520 nm, Formula V, $R_1=C_4H_9$, $R_2=N(CH_3)_2$, n=1, $Ph_2=$1,4-naphthylene)

0.7% of azo dyestuff G 241 (λmax=560 nm, Formula V, $R_1=C_4H_9$, $R_2=N(C_2H_5)_2$, n=2, $Ph_3=$1,4-naphthylene) and 2.9% of a mixture of naphthoquinone dyestuffs of the Formula IV (obtainable by reaction of 4,8-diamino-1,5-naphthoquinone with equimolar amounts of 4-n-butoxyaniline, 4-n-pentoxyaniline, 4-n-hexyloxyaniline and 4-n-heptyloxyaniline, λmax=688 nm)

are dissolved in a liquid-crystal mixture of

24% of r-1-cyano-cis-4-(trans-4-n-propylcyclohexyl)-1-n-heptylcyclohexane

21% of r-1-cyano-cis-4-(trans-4-n-gentylcyclohexyl)-1-n-pentylcyclohexane

12% of r-1-cyano-cis-4-(trans-4-n-heptylcyclohexyl)-1-n-propylcyclohexane

17% of trans-4-n-propylcyclohexyl p-trans-4-n-butylcyclohexylbenzoate

12% of trans-4-n-propylcyclohexyl p-trans-4-n-pentylcyclohexylbenzoate and

14% of trans-4-n-propylcyclohexyl trans-4-n-pentylcyclohexanecarboxylate.

In an electro-optical display element at a layer thickness of 2 μm, this guest-host system shows a color separation ΔE to the point of achromatism of 0.8 under artificial light (CIE-A) and a color separation ΔE of 0.5 under daylight (CIE-D65). The color separations ΔE a layer thickness of 6 μm (10 μm) are 0.9 (0.2) (CIE-A) and 0.5 (0.1) (CIE-D65).

These figures show that the color properties of the electro-optical display element for the human eye are independent of the mode of illumination and layer thickness selected.

EXAMPLE 10

0.9% of azo dyestuff G 232 (λmax=443 nm, Formula V, $R_1=R_2=NHC_4H_9$, n=2, $Ph_3=$1,4-naphthylene), 0.4% of azo dyestuff G 239 (λmax=520 nm, Formula V, $R_1=C_4H_9$, $R_2=N(CH_3)_2$, n=1, $Ph_2=$1,4-naphthylene), 0.9% of azo dyestuff G 241 (λmax=560 nm, Formula V, $R_1=C_4H_9$, $R_2=N(C_2H_5)_2$, n=2, $Ph_3=$1,4-naphthylene) and 3.7% of a mixture of naphthoquinone dyestuffs of the Formula IV (obtainable by reaction of 4,8-diamino-1,5-naphthoquinone with equimolar amounts of 4-n-butoxyaniline, 4-n-pentoxyaniline, 4-n-hexyloxyaniline and 4-n-heptyloxyaniline, λmax=688 nm)

are dissolved in a liquid-crystal mixture of

15% 4-(trans-4-propylcyclohexyl)benzonitrile

27% 4-(trans-4-propylcyclohexyl)-ethylbenzene

10% 4-(trans-4-propylcyclohexyl)-ethoxybenzene

7% 4-(trans-4-pentylcyclohexyl)-4'-cyanobiphenyl

9% 4-(trans-4-propylcyclohexyl)-ethylbiphenyl

8% 4-(trans-4-pentylcyclohexyl)-ethylbiphenyl

10% 4-(trans-4-pentylcyclohexyl)-4'-(trans-4-propylcyclohexyl)-biphenyl

8% 4-propylphenyl 4-(trans-4-propylcyclohexyl)-benzoate and

6% 4-propylphenyl 4-(trans-4-pentylcyclohexyl)-benzoate.

This mixture shows a melting point of −16° and a clear point of 88°.

In an electro-optical display element at a layer thickness of 1 μm, this guest-host system shows a color separation ΔE to the point of achromatism of 0.2 under artificial light (CIE-A) and a color separation ΔE of 0.7 under daylight (CIE-D65). The color separation ΔE at a layer thickness of 8 μm is 0.1 under artificial light (CIE-A) and daylight (CIE-D65).

These figures show that the color properties of the electro-optical display element for the human eye are independent of the mode of illumination and layer thickness selected.

EXAMPLE 11

1.1% of azo dyestuff G 232 (λmax=443 nm, Formula V, $R_1=R_2=NHC_4H_9$, n=2, $Ph_3=$1,4-naphthylene), 0.65% of azo dyestuff G 239 (λmax=520 nm, Formula V, $R_1=C_4H_9$, $R_2=N(CH_3)_2$, n=1, $Ph_2=$1,4-naphthylene), 0.5% of azo dyestuff G 241 (λmax=560 nm, Formula V, $R_1=C_4H_9$, $R_2=N(C_2H_5)_2$, n=2, $Ph_3=$1,4-naphthylene), 2.1% of a mixture of naphthoquinone dyestuffs of the Formula IV (obtainable by reaction of 4,8-diamino-1,5-naphthoquinone with equimolar amounts of 4-n-butoxyaniline, 4-n-pentoxyaniline, 4-n-hexyloxyaniline and 4-n-heptyloxyaniline, λmax=688 nm) and 1.45% ICI anthraquinone dyestuff Green 24 (λmax=640 nm)

are dissolved in a liquid-crystal mixture of

15% 4-(trans-4-propylcyclohexyl)benzonitrile

11% 4-(trans-4-propylcyclohexyl)-ethylbenzene

15% 4-(trans-4-propylcyclohexyl)-methoxybenzene

5% 4-(trans-4-propylcyclohexyl)-ethoxybenzene

6% 4-(trans-4-pentylcyclohexyl)-4'-cyanobiphenyl

12% 4-(trans-4-propylcyclohexyl)-ethylbiphenyl

8% 4-(trans-4-pentylcyclohexyl)-ethylbiphenyl

5% 4,4'-bis-(trans-4-propylcyclohexyl)-biphenyl

6% 4-(trans-4-pentylcyclohexyl)-4'-(trans-4-propylcyclohexyl)-biphenyl

6% 4,4'-bis-(trans-4-propylcyclohexyl)-2-fluorbiphenyl

4% 4-methoxyphenyl trans-4-propylcyclohexanecarboxylate

3% 4-ethoxyphenyl trans-4-propylcyclohexanecarboxylate and

4% 4-methoxyphenyl trans-4-butylcyclohexyanecarboxylate.

This mixture shows a melting point of −20° and a clear point of 114°.

In an electro-optical display element at a layer thickness of 4 μm, this guest-host system shows a color separation ΔE to the point of achromatism of 0.2 under artificial light (CIE-A) and a color separation ΔE of 0.5 under daylight (CIE-D65). The color separation ΔE at a layer thickness of 7 μm are 0.4 (CIE-A) and 0.2 (CIE-D65).

These figures show that the color properties of the electro-optical display element for the human eye are independent of the mode of illumination and layer thickness selected.

This mixture realizes a absorption of 3A in a 9 μm Heilmeier cell with a polarizer for the first time.

EXAMPLE 12

0.85% of azo dyestuff G 232 (λmax=443 nm, Formula V, $R_1=R_2=NHC_4H_9$, n=2, $Ph_3=1,4$-naphthylene), 0.50% of azo dyestuff G 239 (λmax=520 nm, Formula V, $R_1=C_4H_9$, $R_2=N(CH_3)_2$, n=1, $Ph_2=1,4$-naphthylene), 0.46% of azo dyestuff G 241 (λmax=560 nm, Formula V, $R_1=C_4H_9$, $R_2=N(C_2H_5)_2$, n=2, $Ph_3=1,4$-naphthylene), 1.62% of a mixture of naphthoquinone dyestuffs of the Formula IV (obtainable by reaction of 4,8-diamino-1,5-naphthoquinone with equimolar amounts of 4-n-butoxyaniline, 4-n-pentoxyaniline, 4-n-hexyloxyaniline and 4-n-heptyloxyaniline, λmax=688 nm) and 1.25% ICI anthraquinone dyestuff Green 24 (λmax=640 nm)

are dissolved in a liquid-crystal mixture of
15% 4-(trans-4-propylcyclohexyl)benzonitrile
27% 4-(trans-4-propylcyclohexyl)-ethylbenzene
10% 4-(trans-4-propylcyclohexyl)-ethoxybenzene
7% 4-(trans-4-pentylcyclohexyl)-4'-cyanobiphenyl
9% 4-(trans-4-propylcyclohexyl)-ethylbiphenyl
8% 4-(trans-4-pentylcyclohexyl)-ethylbiphenyl
10% 4-(trans-4-pentylcyclohexyl)-4'-propylcyclohexyl)biphenyl
8% 4-propylphenyl 4-(trans-4-propylcyclohexyl)benzoate and
6% 4-propylphenyl 4-(trans-4-pentylcyclohexyl)benzoate.

This mixture shows a melting point of −16° and a clear point of 89°.

In an electro-optical display element at a layer thickness of 3 μm, this guest-host system shows a color separation ΔE to the point of achromatism of 0.3 under artificial light (CIE-A) and a color separation ΔE of 0.7 under daylight (CIE-D65). The color separations ΔE at a layer thickness of 10 μm are 0.15 (CIE-A) and 0.04 (CIE-D65).

These figures show that the color properties of the electro-optical display element for the human eye are independent of the mode of illumination and layer thickness selected.

This mixture realizes a absorption of 2.3 A in a 9 μm Heilmeier cell with a polarizer.

EXAMPLE 13

0.75% of azo dyestuff G 232 (λmax=443 nm, Formula V, $R_1=R_2=NHC_4H_9$, n=2, $Ph_3=1,4$-naphthylene), 0.30% of azo dyestuff G 239 (λmax=520 nm, Formula V, $R_1=C_4H_9$, $R_2=N(CH_3)_2$, n=1, $Ph_2=1,4$-naphthylene), 0.65% of azo dyestuff G 241 (λmax=560 nm, Formula V, $R_1=C_4H_9$, $R_2=N(C_2H_5)_2$, n=2, $Ph_3=1,4$-naphthylene) and 2.75% of a mixture of naphthoquinone dyestuffs of the Formula IV (obtainable by reaction of 4,8-diamino-1,5-naphthoquinone with equimolar amounts of 4-n-butoxyaniline, 4-n-pentoxyaniline, 4-n-hexyloxyaniline and 4-n-heptyloxyaniline, λmax=688 nm)

are dissolved in a liquid-crystal mixture of
15% 4-(trans-4-propylcyclohexyl)benzonitrile
12% 4-(trans-4-butylcyclohexyl)-benzonitrile
10% 4-(trans-4-propylcyclohexyl)-ethylbenzene
14% 4-(trans-4-propylcyclohexyl)-methoxybenzene
6% 4-(trans-4-pentylcyclohexyl)-4'-cyanobiphenyl
10% 4-(trans-4-propylcyclohexyl)-4'-ethylbiphenyl
9% 4-(trans-4-pentylcyclohexyl)-4'-ethylbiphenyl
4% 4,4-bis-(trans-4-propylcyclohexyl)-biphenyl
6% 4-(trans-4-pentylcyclohexyl)-4'-(trans-4-propylcyclohexyl)-biphenyl
8% 4-propylphenyl 4-(trans-4-propylcyclohexyl)benzoate and
6% 4-propylphenyl 4-(trans-4-pentylcyclohexyl)benzoate.

This mixture shows a melting point of −18° and a clear point of 105°.

In an electro-optical display element at a layer thickness of 1 μm, this guest-host system shows a color separation ΔE to the point of achromatism of 0.3 under artificial light (CIE-A) and a color separation ΔE of 0.2 under daylight (CIE-D65). The color separations ΔE at a layer thickness of 11 μm are 0.04 (CIE-A) and 0.01 (CIE-D65).

These figures show that the color properties of the electro-optical display element for the human eye are independent of the mode of illumination and layer thickness selected.

EXAMPLE 14

1.10% of azo dyestuff G 232 (λmax=443 nm, Formula V, $R_1=R_2=NHC_4H_9$, n=2, $Ph_3=1,4$-naphthylene), 0.65% of azo dyestuff G 239 (λmax=520 nm, Formula V, $R_1=C_4H_9$, $R_2=N(CH_3)_2$, n=1, $Ph_2=1,4$-naphthylene), 0.50% of azo dyestuff G 241 (λmax=560 nm, Formula V, $R_1=C_4H_9$, $R_2=N(C_2H_5)_2$, n=2, $Ph_3=1,4$-naphthylene), 0.73% of a mixture of naphthoquinone dyestuffs of the Formula IV (obtainable by reaction of 4,8-diamino-1,5-naphthoquinone with equimolar amounts of 4-n-butoxyaniline, 4-n-pentoxyaniline, 4-n-hexyloxyaniline and 4-n-heptyloxyaniline, λmax=688 nm), 1.10% ICI anthraquinone dyestuff Green 24 (λmax=640 nm) and 2.20% anthraquinone dyestuff LCD-105 (formula III, Z=Y=H, $R_3=R_4=H$, W=X=$NH_2$, $R_1$, $R_2$=(—CO—)$_2$N—$C_3H_6$—O—$C_8H_{17}$; λmax=680 nm)

are dissolved in a liquid-crystal mixture of example 11. This mixture shows a melting point of −20° and a clear point of 113°.

In an electro-optical display element at a layer thickness of 2 μm, this guest-host system shows a color separation ΔE to the point of achromatism of 0.4 under artificial light (CIE-A) and a color separation ΔE of 0.3 under daylight (CIE-D65). The color separations ΔE at a layer thickness of 8 μm are 0.3 (CIE-A) and 0.1 (CIE-D65).

These figures show that the colour properties of the electro-optical display element for the human eye are independent of the mode of illumination and layer thickness selected.

EXAMPLE 15

1.10% of azo dyestuff G 232 ($\lambda max=443$ nm, Formula V, $R_1=R_2=NHC_4H_9$, $n=2$, $Ph_3=1,4$-naphthylene), 0.65% of azo dyestuff G 239 ($\lambda max=520$ nm, Formula V, $R_1=C_4H_9$, $R_2=N(CH_3)_2$, $n=1$, $Ph_2=1,4$-naphthylene), 0.50% of azo dyestuff G 241 ($\lambda max=560$ nm, Formula V, $R_1=C_4H_9$, $R_2=N(C_2H_5)_2$, $n=2$, $Ph_3=1,4$-naphthylene), 0.95% of a mixture of naphthoquinone dyestuffs of the Formula IV (obtainable by reaction of 4,8-diamino-1,5-naphthoquinone with equimolar amounts of 4-n-butoxyaniline, 4-n-pentoxyaniline, 4-n-hexyloxyaniline and 4-n-heptyloxyaniline, $\lambda max=688$ nm)

0.70% ICI anthraquinone dyestuff Green 24 ($\lambda max=640$ nm) and 2.00% anthraquinone dyestuff LCD-106 (formula III, $Z=Y=H$, $R_3=R_4=H$, $W=X=NH_2$, $R_1$, $R_2=(-CO)(-CNH)N-C_2H_4-O-C_6H_{13}$; $\lambda max=668$ nm)

are dissolved in a liquid-crystal mixture of example 11. This mixture shows a melting point of $-20°$ and a clear point of $112°$.

In an electro-optical display element at a layer thickness of 4 μm, this guest-host system shows a color separation ΔE to the point of achromatism of 0.2 under artificial light (CIE-A) and a color separation ΔE of 0.3 under daylight (CIE-D65). The color separations ΔE at a layer thickness of 2 μm are 0.5 (CIE-A) and 0.1 (CIE-D65).

These figures show that the color properties of the electro-optical display element for the human eye are independent of the mode of illumination and layer thickness selected.

EXAMPLE 16

1.10% of azo dyestuff G 232 ($\lambda max=443$ nm, Formula V, $R_1=R_2=NHC_4H_9$, $n=2$, $Ph_3=1,4$-naphthylene), 0.65% of azo dyestuff G 239 ($\lambda max=520$ nm, Formula V, $R_1=C_4H_9$, $R_2=N(CH_3)_2$, $n=1$, $Ph_2=1,4$-naphthylene), 0.50% of azo dyestuff G 241 ($\lambda max=560$ nm, Formula V, $R_1=C_4H_9$, $R_2=N(C_2H_5)_2$, $n=2$, $Ph_3=1,4$-naphthylene), 1.30% of a mixture of naphthoquinone dyestuffs of the Formula IV (obtainable by reaction of 4,8-diamino-1,5-naphthoquinone with equimolar amounts of 4-n-butoxyaniline, 4-n-pentoxyaniline, 4-n-hexyloxyaniline and 4-n-heptyloxyaniline, $\lambda max=688$ nm)

1.45% ICI anthraquinone dyestuff Green 24 ($\lambda max=640$ nm) and 2.15% anthraquinone dyestuff LCD-109 (formula III, $Z=Y=H$, $R_3=R_4=H$, $W=X=NH_2$, $R_1$, $R_2=(-CO)(CS)N-C_2H_4-O-C_6H_{13}$; $\lambda max=763$ nm)

are dissolved in a liquid-crystal mixture of example 11. This mixture shows a melting point of $-20°$ and a clear point of $114°$.

In an electro-optical display element at a layer thickness of 6 μm, this guest-host system shows a color separation ΔE to the point of achromatism of 0.2 under artificial light (CIE-A) and a color separation ΔE of 0.1 under daylight (CIE-D65). The color separations ΔE at a layer thickness of 8 μm are <0.01 (CIE-A) and (CIE-D65).

These figures show that the color properties of the electro-optical display element for the human eye are independent of the mode of illumination and layer thickness selected.

EXAMPLE 17

1.10% of azo dyestuff G 232 ($\lambda max=443$ nm, Formula V, $R_1=R_2=NHC_4H_9$, $n=2$, $Ph_3=1,4$-naphthylene), 0.65% of azo dyestuff G 239 ($\lambda max=520$ nm, Formula V, $R_1=C_4H_9$, $R_2=N(CH_3)_2$, $n=1$, $Ph_2=1,4$-naphthylene), 0.50% of azo dyestuff G 241 ($\lambda max=560$ nm, Formula V, $R_1=C_4H_9$, $R_2=N(C_2H_5)_2$, $n=2$, $Ph_3=1,4$-naphthylene), 1.15% of a mixture of naphthoquinone dyestuffs of the Formula IV (obtainable by reaction of 4,8-diamino-1,5-naphthoquinone with equimolar amounts of 4-n-butoxyaniline, 4-n-pentoxyaniline, 4-n-hexyloxyaniline and 4-n-heptyloxyaniline, $\lambda max=688$ nm)

0.80% ICI anthraquinone dyestuff Green 24 ($\lambda max=640$ nm) and 2.20% anthraquinone dyestuff LCD-111 (formula III, $Z=Y=H$, $R_3=R_4=H$, $W=X=NH_2$, $R_1$, $R_2=(-CO)(C=N-C_2H_4-O-C_8H_{17})N-C_2H_4-O-C_6H_{13}$; $\lambda max=670$ nm)

are dissolved in a liquid-crystal mixture of example 10. This mixture shows a melting point of $-16°$ and a clear point of $87°$.

In an electro-optical display element at a layer thickness of 5 μm, this guest-host system shows a color separation ΔE to the point of achromatism of 0.4 under artificial light (CIE-A) and a color separation ΔE of 0.1 under daylight (CIE-D65). The color separations ΔE at a layer thickness of 8 μm are 0.3 (CIE-A) and 0.1 (CIE-D65).

These figures show that the color properties of the electro-optical display element for the human eye are independent of the mode of illumination and layer thickness selected.

The preceding examples can be repeated with similar success by substituting the generically or specifically described reactants and/or operating conditions of this invention for those used in the preceding examples. From the foregoing description, one skilled in the art can easily ascertain the essential characteristics of this invention and, without departing from the spirit and scope thereof, can make various changes and modifications of the invention to adapt it to various usages and conditions.

What is claimed is:

1. In a liquid-crystal guest-host system comprising a host liquid crystal dielectric and at least two pleochroic dyestuffs, the improvement wherein the system comprises an effective amount of at least one pleochroic dyestuff having an absorption maximum above 665 nm such that an electro-optical display element containing the liquid-crystal guest-host system exhibits a color separation ΔE, measured by the CIE (1964) method, from the point of achromatism which is less than 5 units, whereby the color properties of the electro-optical display elements are essentially independent of both the mode of illumination and the thickness of the liquid cyrstalline dielectric therein.

2. A system of claim 1, wherein the total amount of all pleochroic dyestuffs is 0.1 to 15 wt %.

3. A system of claim 1, wherein the total amount of pleochroic dyestuffs having an absorption maximum above 665 nm is 0.5 to 5 wt %.

4. A system of claim 1, wherein at least one pleochroic dyestuff is a napthoquinone or an azo dyestuff.

5. A system of claim 1, wherein at least one pleochroic dyestuff is an anthraquinone or a perylene dyestuff.

6. A system of claim 4 comprising 0.1 to 5 wt % of at least one pleochroic azo dyestuff having an absorption maximum above 665 nm.

7. A system of claim 1, wherein said ΔE value is less than 1 unit.

8. A system of claim 1, wherein said ΔE value is less than 0.5 unit.

9. A system of claim 1, wherein the pleochroic dyestuff having an absorption maximum above 665 nm is a mixture of naphthoquinone dyestuffs prepared by reacting 4,8-diamino-1,5-naphthoquinone with equimolar amounts of 4-n-butoxyaniline, 4-n-pentyloxyaniline, 4-n-hexyloxyaniline and 4-n-heptyloxyaniline.

10. A system of claim 2, wherein said ΔE value is less than 1 unit.

11. A system of claim 3, wherein said ΔE value is less than 1 unit.

12. A system of claim 4, wherein said ΔE value is less than 1 unit.

13. A method of rendering the color properties of a liquid crystalline electro-optical display element essentially independent of the mode of illumination and of the thickness of the liquid crystal dielectric layer in the element, wherein the dielectric is a liquid-crystal guest-host system comprising at least one pleochroic dyestuff, comprising including in the dielectric an effective amount of at least one pleochroitic dyestuff having an absorption maximum above 665 nm such that the liquid-crystal guest-host system exhibits a color separation ΔE, measured by the CIE (1964) method, from the point of achromatism which is less than 5 units.

14. In a liquid crystalline electro-optical display element based on a liquid-crystal guest-host system, the improvement wherein the latter system is one of claim 1.

15. A system of claim 1, wherein said absorption maximum is above 670 nm.

16. A system of claim 1, wherein said absorption maximum is above 685 nm.

17. A system of claim 16, wherein said ΔE value is less than 0.5 units.

* * * * *